United States Patent Office 3,315,561
Patented Apr. 25, 1967

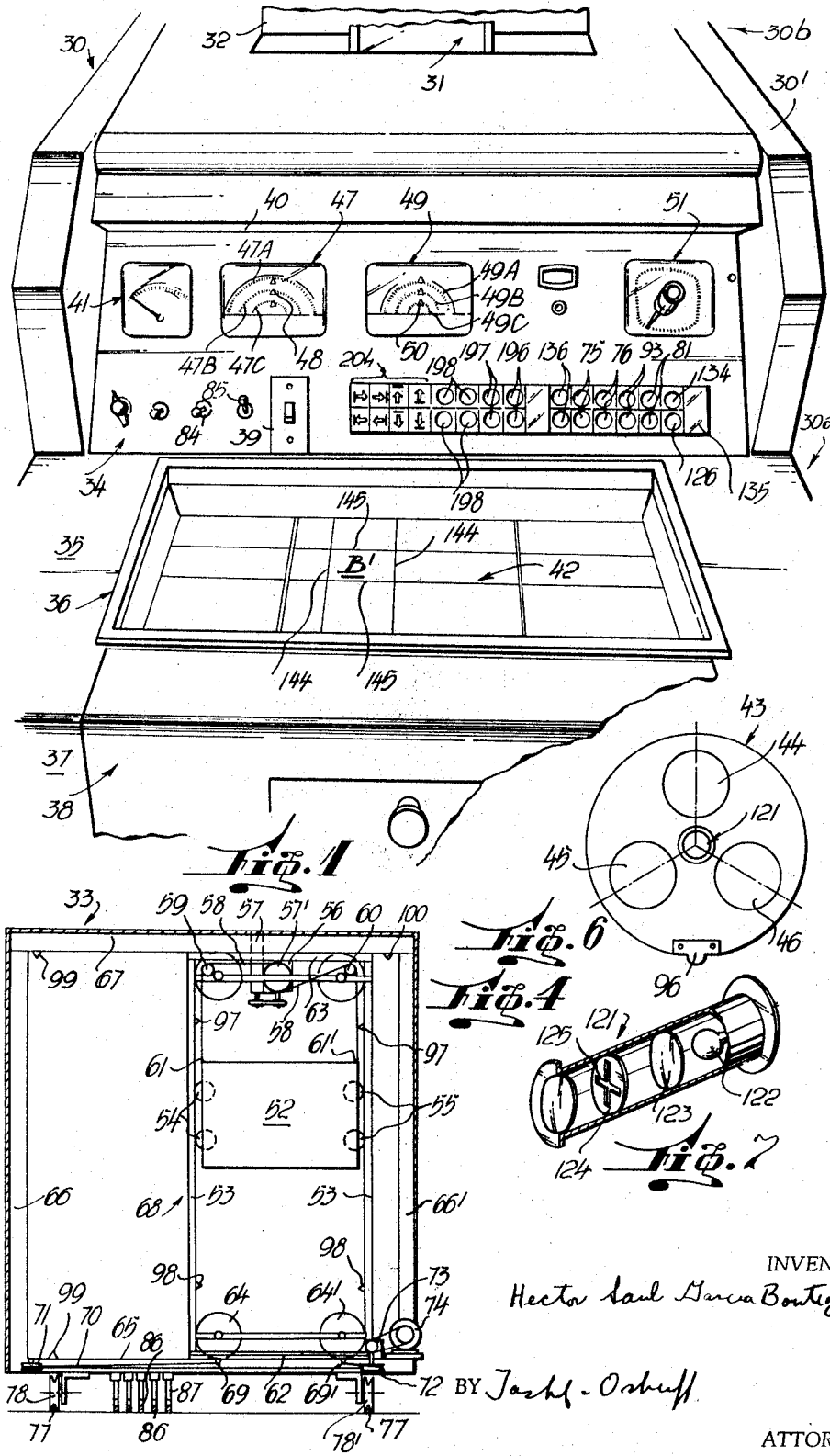

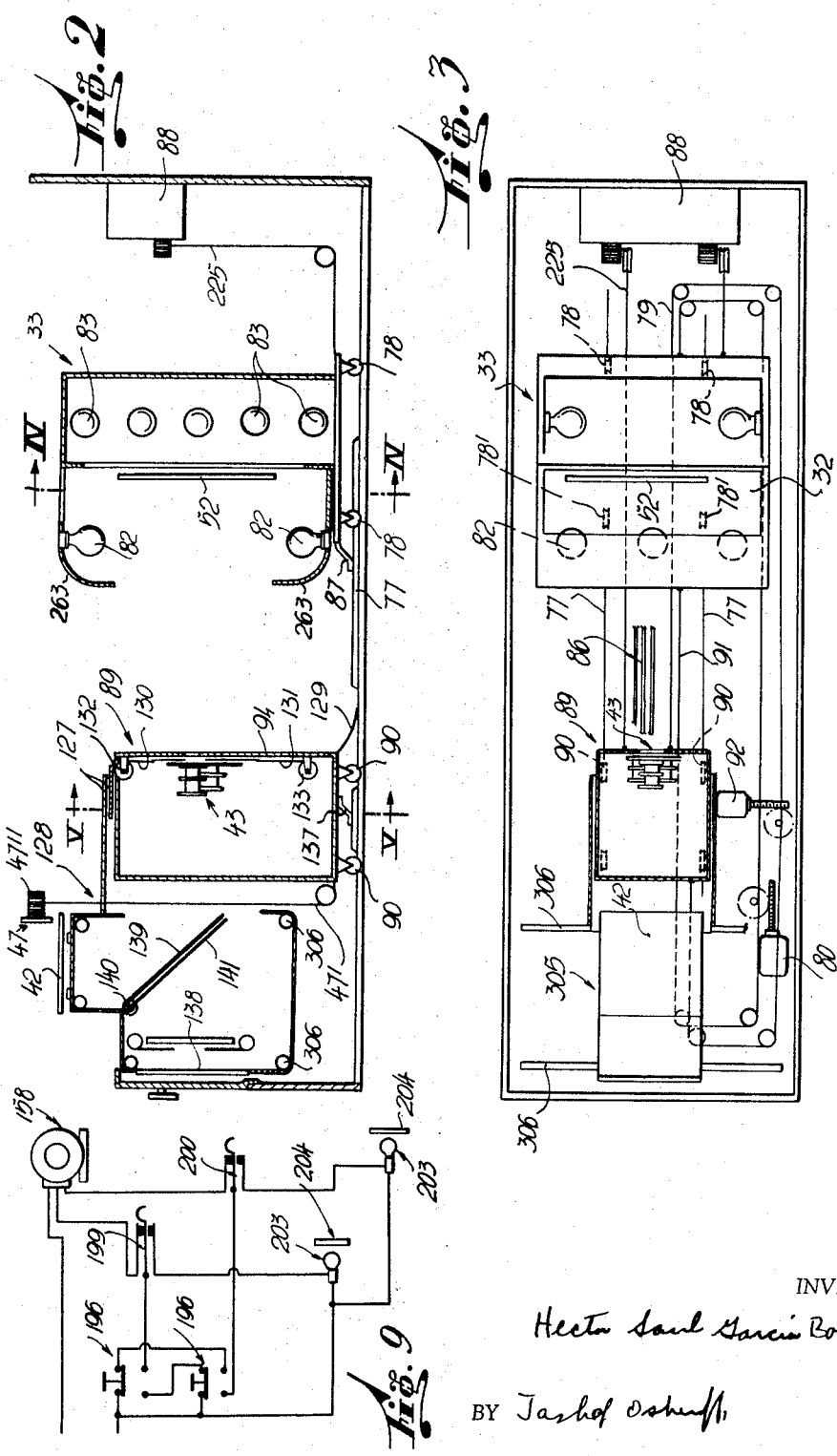

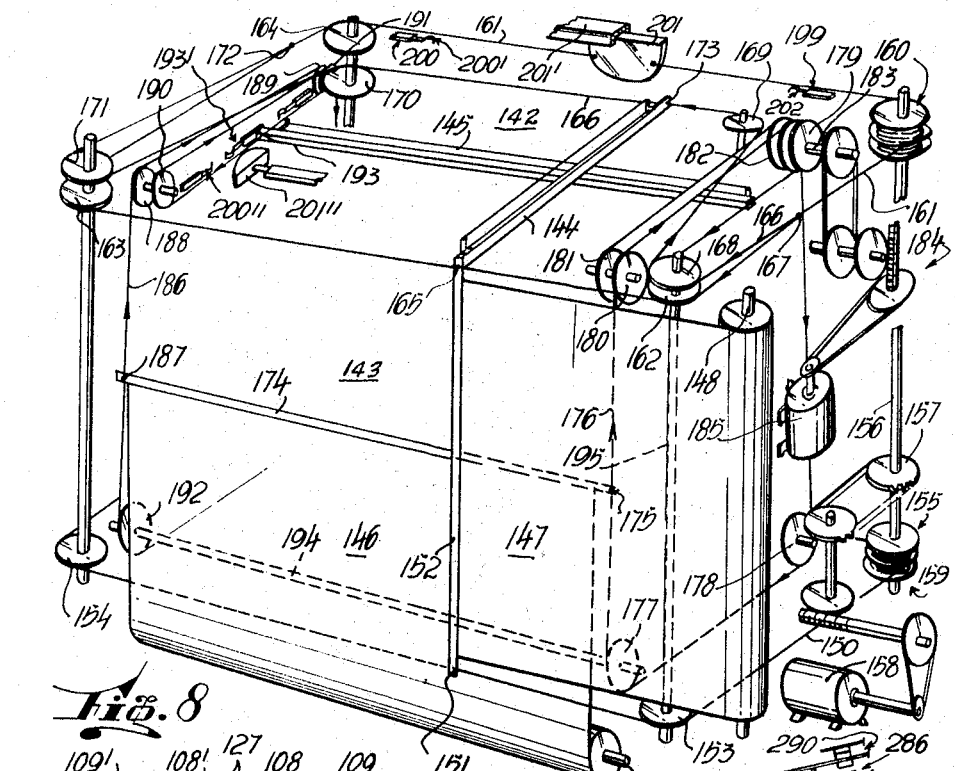
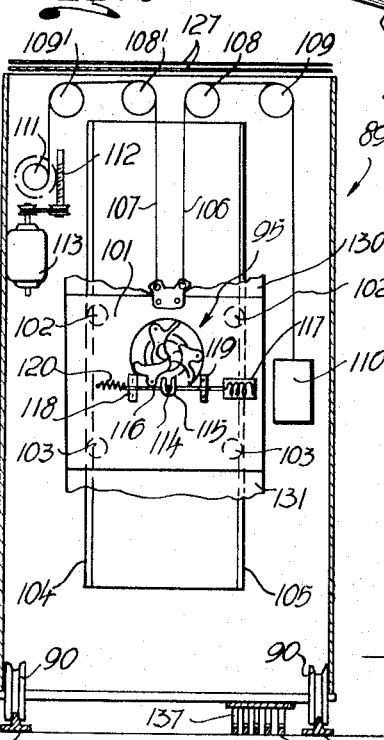
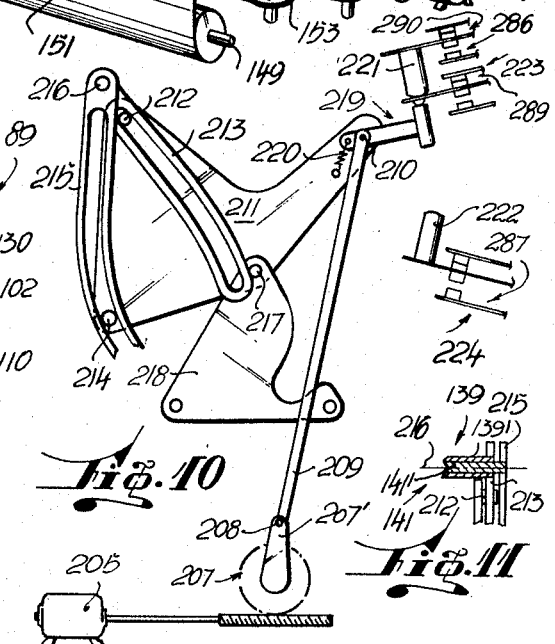

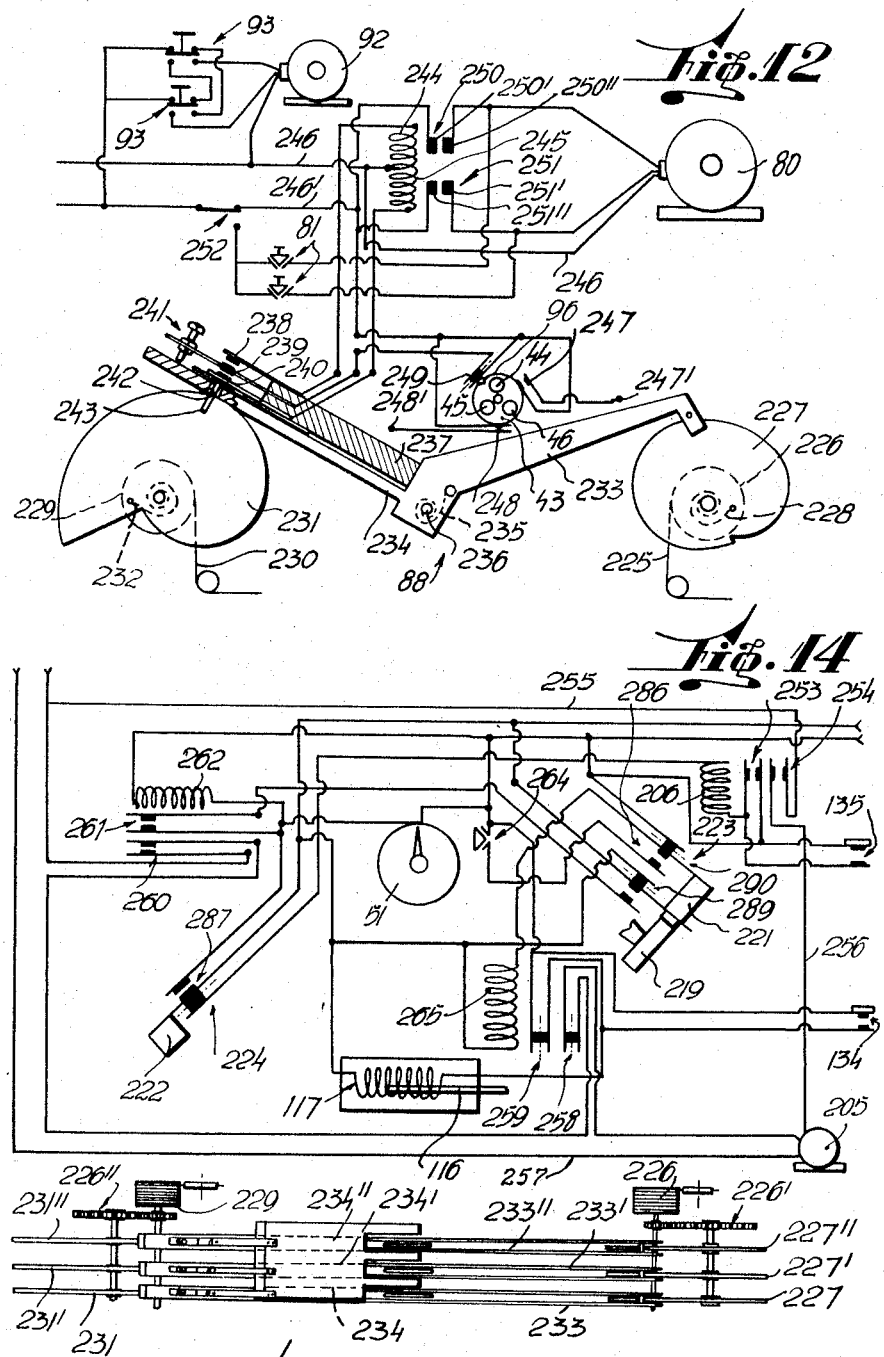

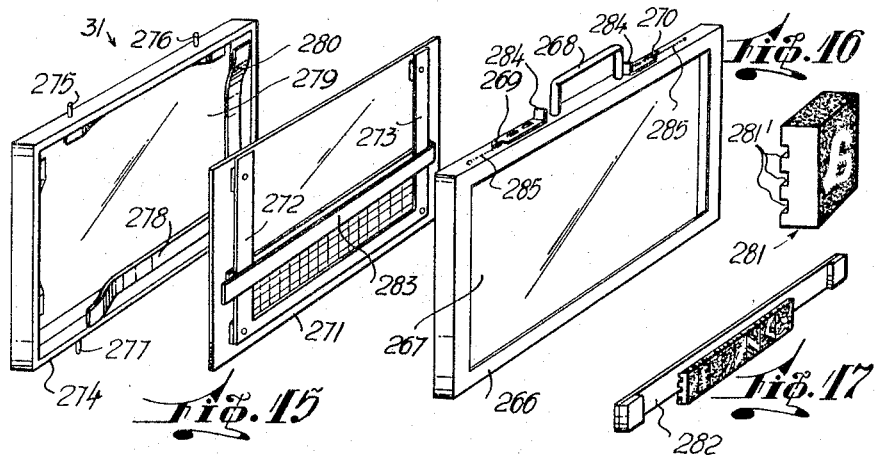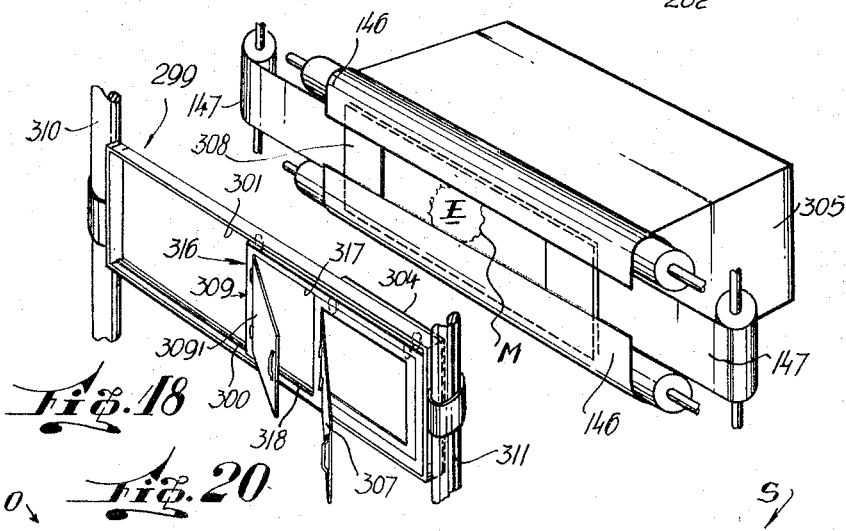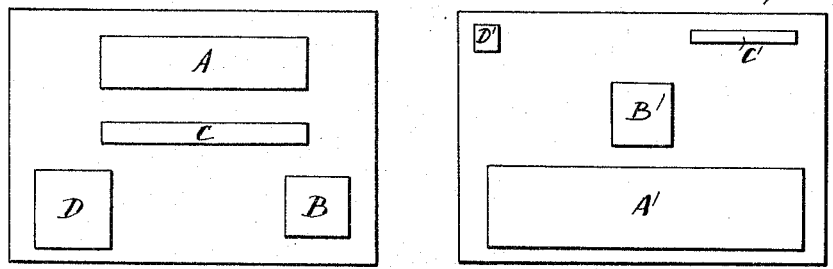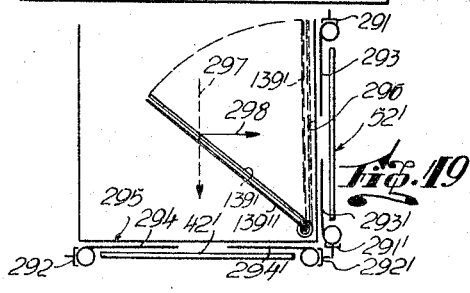

3,315,561
PHOTO-COMPOSING MACHINE
Hector S. Garcia Boutigue, 3325 Bahia Blanca St.,
Buenos Aires, Argentina
Filed Nov. 30, 1964, Ser. No. 414,561
20 Claims. (Cl. 88—24)

The present invention relates to photo-composition and more particularly to a machine for composing and photographing different matters on to a single photographic plate or film to form a predetermined pattern.

In order to avoid confusion, "photographic plate or film" will hereinafter be referred to only as "film."

The word "pattern" is to be understood as applicable to scenes, figures and the like, or to groups of letters forming words or sentences or to a combination of them.

"Original" is to be interpreted as the plate from which the photo-composition is to be made.

"Zones" are portions of said original used for obtaining the desired composition on the film.

Reverting now to the present invention, from a more specific angle, the former contemplates the provision of a machine with a centralized control post, by means of which, a single operator may compose and photograph different zones from the original which may be a photograph, a composed text and the like, in order to prepare a negative or positive film to be used for type-printing, electrotypes for off-set and the like, as well as also for preparing originals for printing pamphlets, advertisements, etc.

The problem which arises in the prior art in preparing these films is that the original or the several originals to be photographed are usually not of the required size and bear no logical aesthetic size relationship, one with respect to the other, with regard to the result which is to be obtained.

Thus in order to compose, it is up to now necessary to photograph the originals one by one, in such a way that all the resulting patterns are of the desired size and then compose all these patterns to produce therefrom a second original to be again photographed, in order to obtain the desired final film.

The steps followed up to now in the art are the following:

(1) To photograph part of the original;
(2) Separately photograph each one of the patterns which require a different size proportion in relationship to the pattern of item 1;
(3) Compose the film, with the different photographed patterns, in order to obtain a complete original;
(4) Rephotograph the complete original of item 3.

It is also known in the art to only use the first three steps provided that an extremely careful composition of film pieces are made, so that the joints do not become visible, but this is a very cumbersome task.

These steps, which have been set down without any details, merely give a vague idea of how troublesome and costly it is to undertake any photo-composition, inasmuch as each one of the enunciated steps requires a series of sub-steps and preparations such as clipping, securing to a base, calculating sizes, preparing separating spaces, etc.

This, as has been stated, is a long and costly process and gives room to much loss, as invariably it involves costly and difficult manual operations which are subject to error.

It is an aim of the present invention to overcome these drawbacks avoiding the known methods, and more particularly making it unnecessary to first print an original which is to be photographed.

The present invention becomes particularly useful when a composition of texts either alone or combined with scenes or figures has to be made, since so far it has been necessary to photograph usually, separately, letter by letter, compose the sentences and then rephotograph the composed text.

The photo-compositon machine according to the present invention, allows the operator to obtain, on a single film as many partial photographs as may prove necessary, positioning each pattern in its required position and achieving directly the predetermined size.

More particularly, the present invention consists in a photo-composing machine, comprising a holder carriage for originals to be photo-composed, a lens carriage facing said holder carriage, means for moving the combination of both carriages in three substantially perpendicular directions, a film bracket for a film, a view-finder, said film bracket and view-finder being optically coupled amongst themselves and to said lens carriage, and mask means capable of masking part of said view-finder and film bracket.

In addition the machine may be provided with screen means for sealing said film against light, upon said view-finder being operative and sealing said view-finder upon said film being exposable, as well as with shutter means in said lens carriage which are operatively coupled to said mask means.

Considering the invention from another angle, the photo-composing machine may also be defined as comprising a housing defining a floor zone with guide means, a front end portion and a rear end portion, said front end portion including a control panel, a view-finder and a film bracket coupled to said view-finder, said rear end portion has an opening, said guide means on said floor zone being arranged between said front end portion and said rear end portion, a supporting frame arrangement for originals, a holder carriage movably mounted on said guide means adjacent said read end portion, driving means controllable from said control panel for moving said holder carriage along said guide means for focussing purposes, said holder carriage including a bracket for said supporting frame for originals, said bracket being movably mounted perpendicularly to said guide means on said holder carriage, said opening enables to insert and withdraw said supporting frame arrangement for originals from said bracket of said holder carriage, a movable lens carriage mounted on the same guide means and located between said holder carriage and said front end portion, said lens carriage including a base plate vertically movable within said lens carriage, at least one lens on said base plate directed towards said bracket of said holder carriage, a shutter arrangement mounted on said base plate behind said lens and adapted to face said film bracket, said view-finder and film bracket defining a maskable exposure zone, position index means on said control panel indicating the position of said lens carriage with regard to said guide means, thereby defining the scale of the photograph to be taken, and a firing circuit for said shutter arrangement adapted to maintain said shutter arrangement open in inoperative position and successively to close, open, close again and open again said shutter arrangement in timed sequence upon becoming operative, the period existing between the opening and closing, after the first closure, defining the exposure of the film, said firing circuit being operable from said control panel.

According to one aspect of the present invention, before photographing on the film, the operator can check the composition on a ground-glass view finder which enables him to visualize, in true scale and size, the pattern to be photographed which will usually define a zone on said film and thus he may perform whatever alteration he considers necessary from the aesthetical view point, prior to actually photographing.

Thus, it is not necessary to fulfill all the steps of the foregoing numbered items, as was necessary in the prior art machines, and which many times require a pre-printing of the text in order to photograph it, which also implies high costs, and which involves problems due to incorrect inking and errors due to wear of the types. Furthermore, it is not necessary to provide various sizes of types, since the proposed apparatus may enlarge or reduce, as from a single sized type, and likewise fit the pattern to be photographed in its predetermined position. Also, it permits the operator to obtain positive films from white letter types with a dark or black background. Thus, the texts to be obtained involve a low cost and a high speed of operation.

A further advantage and object of this apparatus resides in the fact that two luminous sources are provided, one for transparent or translucid originals, that is to say for direct illumination and the other for indirect illumination to be used for non-transparent originals.

Another advantage of the photo-composing machine of the present invention is that due to a particular control circuit it is possible to obtain an automatic focusing.

Another feature which saves time and work resides in that the view-finder has not to be removed each time prior to photographing on the film, as is the case in the known machines.

Another object of the present invention is to provide a machine, where each zone of the original may be focused within any desired limit, due to the possibility of moving the lens with regard to the original, the original with regard to the lens and the film, and the film with regard to the lens, so that any desired adjustment with regard to the optical axis of the lens may be achieved.

A further object is to provide a photo-composing machine, where from a single original, if desired, any type of photo-composing as far as distribution of size, special effects, such as flux may be achieved, on the film, without having to change the original and by performing all the operations from a single control post.

A still further object is to provide a photo-composing machine, wherein means are provided for even forming irregularly shaped patterns and yet enable a direct photo-composition on the film.

Another object is to provide a synchronized, at will controllable, curtain and indicator arrangement, which enables the operator to see on a view finder the zone to be photographed, which corresponds to the same zone on the film, and special warning means which advise the operator when the curtains of the curtain and indicator arrangement are closed fully opened.

A further object is to provide means whereby the same lens is used for the view finder and film, with special screen means which assure that the film can only be exposed, once the view finder has been light sealed from the film.

These and further objects and advantages will become more apparent during the course of the following description, wherein by way of example, several different embodiments are described in relationship to the accompanying drawings, wherein:

FIG. 1 is a somewhat schematic perspective view, showing the photo-composing machine, according to the present invention, from the front end.

FIG. 2 is a schematic longitudinal section of the machine.

FIG. 3 is a schematic top plan view of the machine shown in FIG. 2.

FIG. 4 is a section along line IV—IV of FIG. 2, showing the holder carriage for the originals supporting frame with additional details.

FIG. 5 is a section along line V—V of FIG. 2, showing the lens and shutter carriage with additional details.

FIG. 6 is a detail, showing a schematical front end view of the revolver lens holder.

FIG. 7 is a detail, in perspective view of a spider arrangement.

FIG. 8 is a schematic perspective view of the indicator and curtain arrangement for the view finder and the film.

FIG. 9 is an electric circuit diagram for the motors of the indicator and curtain arrangement.

FIG. 10 is a schematic side elevation of the actuating mechanism for the mirror and screen.

FIG. 11 is a detail, in section, of the mirror and screen mounting.

FIG. 12 is a detail in side elevation, of the automatic focusing arrangement, including its electrical circuit.

FIG. 13 is a top plan view of a further detail of the automatic focusing arrangement.

FIG. 14 shows the control circuit for the shutter arrangement.

FIG. 15 is an exploded perspective view of the supporting frame arrangement for the originals.

FIG. 16 is a perspective view of a type.

FIG. 17 is a perspective view of a line forming type holder.

FIG. 18 is an exploded perspective view of an alternative embodiment of the curtain arrangement and accessories, for irregular shaped masks.

FIG. 19 is a schematic cross-section of an alternative embodiment of the view finder and film arrangement particularly used for inverting the image on the film.

FIG. 20 is a schematic lay-out of an original.

FIG. 21 is a schematic lay-out of a schedule for guiding the operator in preparing and photographing the different zones on the film.

It is to be pointed out that similar or alike parts are identified by the same reference numeral, which start with "30."

Referring in first instance to FIG. 1, wherein the photo-composing machine 30 according to the present invention is shown, the first step which has to be carried out in the photo-composing process, is to prepare the original in the supporting frame arrangement 31 which is shown in detail in FIG. 15 and to which reference will be made later on. For the time being, it is sufficient to admit that the original is arranged in the supporting frame arrangement 31.

The photo-composing machine 30 (FIG. 1) comprises a housing 30' having a front end portion 30a and a rear end portion 30b. The base of the housing 30' defines a floor zone 246 (FIG. 3) for guide means which in this embodiment are rails 77 (FIG. 2), to which reference will be made later on.

On the top of the photo-composing machine 30, a door 32 is then opened which enables the operator to insert the supporting frame arrangement 31 into the holder carriage 33 (FIG. 3), to which reference will be made later on. There upon, the door 32 (FIG. 1) is closed and the operator places himself in front of the machine, from where he easily reaches the different controls of the control panel 34. The control panel 34 is slightly backwardly sloped to facilitate better access thereto. In front of the control panel 34, there is a horizontal table 35, in which a viewer frame 36 is inserted for guiding a slidable view finder 42, which enables the operator to see the image of the original which he has to locate in a certain position to carry out the composing process, as will be later better understood.

Below the table 35 and in front thereof, there is a front plate 37 arranged at a right angle with regard to said table 35. Said front plate has an opening covered by a removable lid 38, which enables the operator to insert the film mounted on a film bracket 138 (FIG. 2) and on which the photo-composition is to be photographed.

It may already be stated that the view finder and the opening for the film bracket define an exposure zone, so that it is either possible to see the pattern on the view finder or photograph it on the film, through the pertinent lens and shutter arrangement, to be described later on.

Once the photo-composition has been concluded, the film may be withdrawn by opening the lid 38 and thereafter the supporting frame arrangement 31 is withdrawn by previously opening the door 32. Of course, the film may also be of the roll up type.

As to the control panel 34, the latter is provided with a main switch 39 connected to an electric current supply source (not shown), which enables the connection and disconnection of the entire machine. The main switch 39 also operates directly on an illumination arrangement 40 consisting of a plurality of lamps (not shown) arranged above and in front of the control panel 34 and housed within the machine to illuminate the entire control panel 34. Since the illumination, as such, of the panel does not include any inventive feature, it is not considered necessary to describe it in further detail.

In the embodiment shown, the main switch 39 feeds the different circuits as will be later explained, in parallel with a volt-meter 41 which enables the operator to verify that the supply source provides the correct voltage.

The principle on which the machine of the present invention is based is that, once the original has been housed in the holder carriage 33 (FIG. 2), the photo-composing process may be started in accordance with a predetermined schedule. The schedule consists usually of a transparent sheet, whereon the distribution of the different patterns is preset.

Referring now to FIGS. 20 and 21, where FIG. 20 is representative of the original O and FIG. 21 is representative of the schedule S, the latter has the same size as the view finder 42 on which it is to be placed, so that since said schedule S is transparent, the operator may see the image on the view finder and place it in accordance with the photo-composition which is to be achieved. More particularly, the original O contains the images A, B, C, and D and the schedule S as outlined, the patterns A', B', C', and D'. It will be seen that the image A is smaller than the pattern A' and while the image A is in the upper zone of the original O, the pattern A' is in the lower zone of the transparent schedule sheet S.

The image B is of the same size as the pattern B' but arranged again in a different position. The image C is larger than the pattern C', and arranged in a different position, and the image D is of a larger size than the pattern D', also arranged in a different position.

To achieve different focussings, the machine of the present invention is provided with the revolving lens holder 43 (FIG. 6), having in this particular arrangement three lens arrangements 44, 45 and 46. For instance, lens arrangement 44 having a focal depth of 20 cm.; lens arrangement 45 having a focal depth of 40 cm., and lens arrangement 46 a focal depth of 60 cm. From the example of FIGS. 20 and 21 it may be implied by an expert in the art, that each image will be photographed by a pertinent lens arrangement, depending on the size of the area to be photographed in relationship to the size to be achieved on the film. To this end, the revolving lens holder 43 is rotatably mounted on base plate 101, as will be later seen. Once the suitable lens has been selected, it is necessary to focus the pertinent image, for instance image A, and achieve that the latter appears in the pattern A' through the ground glass view finder 42 (FIG. 1) in correct size and position. Means are provided, which will be explained later on, by means of which, upon exposing the film on the zone corresponding to image A' the rest of the film is shielded against exposure, so that it is thus possible to successively photograph each of the images on the same film in different zones, according to the patterns A', B', C', D'.

The composing and focusing of the images is remote controlled by means of the pertinent push-button arrangements on the control panel 34.

In order to explain the different push-button arrangements and pertinent controls, reference will be made hereinafter to the control panel 34, when describing the different mechanisms.

What may already be stated is, that the control panel 34 is provided with a scale indicator 47 having three movable scales 47A, 47B, 47C and a fixed pointer 48. The scales 47A, 47B, 47C, respectively, correspond to the lens arrangements 44, 45 and 46, so that the operator, knowing which of the lens arrangement he uses, can perfectly read, by means of the pointer 48, what scale he achieves. The scale indicator 47 is arranged next to the voltmeter 41; next to the scale indicator 47, there is a second scale indicator 49 having also three movable scales 49A, 49B and 49C and a fixed pointer 50 and which operates on the same principle and which is used for direct indication of letter size, particularly useful, when texts have to be photographed, where the original is of a single size of letters.

The control panel also includes a timer 51 for controlling the speed of the shutter arrangement, 95 to which reference will be made later on.

Having thus defined the general concepts of the purpose of the machine, it is now possible to consider each of the mechanisms in particular.

Referring in first instance to holder carriage 33, as seen in FIGS. 2 and 4, it consists of a bracket 52 movable in vertical direction within lateral guides 53. As can be seen more in detail in FIG. 4, bracket 52 is related to the lateral guides 53 by means of guide wheels 54, 55 and is controlled in its vertical movement by a reversable electric motor 56 which through a reduction gear arrangement 57, having an invertor, is connected to a pulley 57', having a cable 58 which passes over pulleys 59 and 60 and is secured to the top edges 61 and 61' of bracket 52. Thus, it can be easily understood that on actuating electric motor 56, bracket 52 rises or falls within lateral guides 53; electric motor 56 is controlled from control panel 34 by push-buttons 75, one for upward movement of bracket 52, and one for its downward movement.

Furthermore, as can also be seen in FIG. 4, lateral guides 53 form with base member 62 and top member 63 is a rigid structure 68, mounted on wheels 64, 64' which are capable of running on the base support member 65 of holder carriage 33. Base support member 65 forms a rigid structure with lateral support members 66 and 66' and with top support member 67. Rigid structure 68 is connected by terminals 69, 69' to a wire 70 which passes over pulleys 71 and 72 mounted on base support member 65. Pulley 72 is connected to a speed reducing mechanism 73 further connected to a reversible electric motor 74, mounted on holder carriage 33.

Electric motor 74 is controlled from control panel 34 by means of push-buttons 76, one for each direction of movement. Lateral guides 53 include at their upper and lower ends, the contacts of schematically indicated micro-switches 97, 98 arranged within the path of bracket 52, so that any over-run in the vertical direction may be halted. For this, the contacts of micro-switches 97, 98 are connected in series with the electric motor 56. Thus, on bracket 52 reaching these end positions, micro-switches 97, 98 will open the electric circuit of electric motor 56, so that bracket 52 is not driven past the upper and lower predetermined end positions. Similarly, base support member 65 and top support member 67 are provided with contacts for micro-switches 99 and 100 for opening the electric circuit of motor 74, for interrupting the cross-wire movement of rigid structure 68, with regard to rails 77. As can be seen, both in FIG. 2 and FIG. 4 holder carriage 33 is movable on said rails 77 by means of wheels 78, 78'.

Furthermore, holder carriage 33 is connected at its rear portions to one end of cable 79 while its front portion is connected to the other end of the same cable 79. In order to drive holder carriage 33 along rails 77, cable 79 is connected to a reversible electric motor 80. Electric motor 80 is operable from control panel 34 by means of push-buttons 81. It is to be understood that two push-buttons 81 are provided in order to control the forward and backward movement of the holder carriage 33, respectively, as will be explained more in detail, further on.

Holder carriage 33 (FIG. 2) includes light bulbs 82, for indirect illumination of a non-transparent original O (FIG. 20), mounted on supporting frame arrangement 31 (FIG. 1), which in turn is secured to bracket 52 (FIG. 2). Behind bracket 52 a series of light bulbs 83 are provided for direct illumination of a transparent or translucid original O, which bulbs 83 are mounted in a similar way on supporting frame arrangement 31, as has just been described. It will be understood that light bulbs 82 will be used for non-transparent originals and light bulbs 83 for transparent or translucid originals.

The first light source defined by light bulbs 82 is connected to a source of electric current through a switch 84 (FIG. 1) mounted on control panel 34. Similarly, the second light source defined by light bulbs 83 is connected to a source of electric current through a switch 85, also mounted on control panel 34. Due to the fact that holder carriage 33 is movable on rails 77, it has proved convenient to provide an arrangement of current conducting rails 86 and a corresponding plurality of collector shoes 87 mounted on holder carriage 33. As is apparent, collector shoes 87 are in permanent contact with rails 86. In this way lengthy windable, flexible conductors are avoided, which in most cases have proved to get entangled, if no special means are provided to avoid this.

As will be seen further on, holder carriage 33 is connected to an automatic focusing arrangement 88, schematically illustrated in FIGS. 2 and 3, which is controlled from control panel 34 and permits the operator to obtain a correct focusing of the original, without having to manually determine the position of the holder carriage 33 with respect to the lens and the film, which will all be later explained with reference to FIGS. 12 and 13.

As seen in FIGS. 2 and 3, to the left of holder carriage 33 and also on rails 77, a lens carriage 89 is movable on wheels 90 (see also FIG. 5). Lens carriage 89 is connected by its back portion to one end of a cable 91, while its other end is connected to the front portion of lens carriage 89. In order to run lens carriage 89 along rails 77, cable 91 is coupled to a reversible electric motor 92, which is controlled in its forward and reverse movement by push-buttons 93 mounted on control panel 34, FIG. 1.

On the rear portion 94 (FIG. 2) of lens carriage 89, a revolving lens holder 43 and a shutter arrangement 95 (FIG. 5) are mounted, more particularly, on base plate 101.

Revolving lens holder 43 includes, as seen in FIG. 6, the three lens arrangements 44, 45 and 46 which may be selectively positioned in front of shutter arrangement 95. Revolving lens holder 43 includes a projection 96 which, as will be seen further on, when describing FIG. 12, acts on the automatic focusing arrangement. Revolving lens holder 43 is mounted on base plate 101 (FIG. 5) movable by means of wheels 102, 103 within lateral guides 104, 105. Base plate 101 is conveniently secured to one end of cables 106, 107.

Cable 106 passes over guide pulleys 108, 109 and has secured at its other end a counter-weight 110. Cable 107 passes over guide pulleys 108' and 109' and has its other end wound on a bobbin 111 drivingly connected by a gear mechanism 112 to an electric motor 113. Electric motor 113 is controlled from control panel 34 by means of push-buttons 136, one for the upward movement of base plate 101 and the other for the downward movement of said base plate 101. Counter-weight 110 weighs less than base plate 101 together with the different elements mounted thereon, so that the latter is able to descend due to gravity.

Base plate 101 supports a shutter arrangement 95 of the "Compur" type. The shutter arrangement 95 includes a pin 114 mounted within a horse-shoe-shaped element 115 integral with a movable shaft 116, which also forms the core of electromagnet 117. This arrangement is so connected that when electromagnet 117 is energized, a portion of shaft 116 will enter said electromagnet and close, normally open shutter arrangement 95. In order to provide a bearing surface within which shaft 116 may slide, two bushings 118 and 119, as illustrated in FIG. 5 are mounted on base plate 101. The end of shaft 116 opposite electromagnet 117 is connected to resilient means 120 which urge shaft 116 out of electromagnet 117 and thus open shutter arrangement 95, upon the electromagnet 117 being de-energized.

The energizing of electromagnet 117 may be manually controlled from control panel 34 by means of push-button 134. Furthermore, as will be later described electromagnet 117 may be energized in synchronism with the aforementioned timer 51 by means of push-button 135.

The revolving lens holder 43 previously described, is rotatably mounted on base plate 101 so that one of the lens is permanently facing the shutter arrangement 95. Although in this embodiment the revolving lens holder 43 is manually rotatable, it is to be understood as will be apparent to those skilled in the art, that it may form part of an arrangement including a plate having a toothed crown wheel connected to a motor which may also be controlled from control panel 34.

Revolving lens holder 43 supports in its center defining the axis of rotation, a spider projector 121, which includes a light source 122, better seen in FIG. 7, together with a condenser lens 123 and a shield 124 having a cross shaped aperture 125. The object of this spider projector 121 is to enable the operator to check the position of the respective lens of the revolving lens holder 43 with regard to a schedule, as will be later explained. In practice, the operator actuates push-button 126 mounted on control panel 34 (see FIG. 1), which closes an electric circuit (which will be later described), thus connecting light source 122 to the power source and producing a cross-shaped image on the view finder 42 (FIGS. 1, 2 and 3), and by actuating push-buttons 136 the operator may control the vertical movement of base plate 101 to situate the cross image in a determined vertical position.

In order to fix the cross image's lateral position, slidable means are provided supporting view finder 42 and film bracket 138, which will be later described. It must be borne in mind that the spider projector 121 is arranged at a fixed distance below the optical center of the lens which is to be used in photographing the original that has been previously set in place, as has already been explained. Thus the operator only needs to determine the position of the zone which he wishes to photograph (which is described in relationship to FIGS. 20 and 21), and then position base plate 101, view finder 42 and associated film bracket 138 in such a position, so that the image projected by the spider projector 121 will incide on the view finder at a point, whose distance from the desired position of the zone to be recorded, is equal to the above mentioned fixed distance.

Lens carriage 89 is provided with a light protecting bellows 127 connected to the recording arrangement 128, as schematically shown in FIG. 2, in order to avoid harmful entrance of light from the outside. Furthermore, as may also be appreciated from FIG. 2, light might filter under lens carriage 89 into the recording arrangement 128. In order to avoid this, a flap 129 has been provided, which has one end firmly secured to the lens carriage 89 while its other end is urged onto the floor.

Returning now again to FIG. 5, base plate 101 is wider than the distance between lateral guides 104 and 105, so that no light may filter therebetween. Above the upper and below the lower edges of base plate 101, a space must be provided to enable base plate 101 to run in a vertical direction between guides 104 and 105. Obviously, this space will permit the entrance of light which must be avoided. Thus, an upper roll-up curtain member 130 and a lower roll-up curtain member 131 are provided, each having one end wound on spool 132, 133, respectively, while each other end is secured to the corresponding upper and lower edge of said base plate 101. Spools 132 and 133 are spring loaded, so as to maintain curtains 130 and 131 permanently taut.

Below lens carriage 89 several current conducting rails 86 are mounted parallel to rails 77 (see also FIGS. 2 and 3). A corresponding number of collector shoes 137 are mounted on the bottom of lens carriage 89 and permanently in sliding contact with said current conducting rails 86.

Referring now to the recording arrangement 128 (FIGS. 2 and 3), the latter comprises a frame 305, which is slidably mounted, cross-wise to the axis of rotation of the revolver lens holder 43, on rails 306. Said frame 305 supports on its upper deck the view finder 42 which enters said viewer frame 36 and may be moved along and within the latter. The front face of said frame 305 comprises a film bracket 138, arranged at right angle with regard to said view finder 42. The film bracket 138 enables to insert the film thereinto in proper position, by opening removable lid 38, as previously explained in connection with FIG. 1.

In order to expose only a desired zone both on the view finder 42 and film housed within, the film bracket 138, a suitably coupled curtain and indicator arrangement 144, 145, 146 and 147 is provided, as will be later described.

Since the curtain is a particular embodiment of a mask, it is to be understood that the generic term for "curtain" is "mask." As will be later seen, there is also suggested a further embodiment, wherein any irregularly shaped mask may be used.

Within the frame 305, a mirror 139 is angularly movably mounted about an axis 140. Below mirror 139 a screen 141 is swingably mounted, in order to protect the film during part of the operation, as will be described.

As may be appreciated from FIG. 2, the light rays focused by the pertinent lens 44 or 45 or 46, which incide on mirror 139, will be reflected onto view finder 42, when mirror 139 forms an angle of 45°, both with the view finder and the film, provided that the shutter arrangement 95 is open. In order to photograph the original, it is necessary to raise the mirror 139, so that the rays coming from the original will not be reflected onto the view finder, but will impinge directly on the film. As a general concept it may already now be stated, that the mirror 139 is connected to an automatic mechanism for producing its displacements, which will later be described in detail.

In order to accomplish one of the objects of this machine, it is necessary to provide an arrangement which enables the operator to selectively prefix the position of the image to be photographed, before having to photograph it. Therefore the before mentioned coupled or synchronized arrangement for the curtains 146, 147 and indicators 144, 145 are provided.

Referring in this respect to FIG. 8, wherein the view finder corresponds to upper face 142 and the film to front face 143, upper face 142 is controllable by four indicators to define the desired zones thereon; only two of the indicators, one lateral indicator 144 and one longitudinal indicator 145 are shown, to avoid overburdening the drawing. Front face 143 is shielded by four curtains respectively coupled to the four indicators, so that the positions of the curtains which protect portions of the film, are determined and defined by the indicators mounted on the view finder 42.

In order to simplify the drawing only two curtains have been illustrated, that is to say vertically moving curtain 146 and laterally moving curtain 147.

For the reason given above curtain 147 is coupled to lateral indicator 144 and curtain 146 is coupled to longitudinally indicator 145. It will be appreciated that on curtain 147 moving to the left in FIG. 8, lateral indicator 144 will also move to the left, so that the operator will know which portion of the film is screened from light. As to curtain 146, when this moves upwardly, longitudinal indicator 145 will move towards lateral face 143; this is necessary in view of the fact that the position of the image on the view finder is inverted.

Curtain 147 is wound on a spring loaded shaft 148, while curtain 146 is wound on spring loaded shaft 149.

In order to simultaneously operate curtain 147 and lateral indicator 144, a bottom cable 150 is provided, which is connected at point 151 to a substantially rigid bar 152 to which the free end of curtain 147 is linked. Cable 150 is guided by pulleys 153 and 154, while its free ends are wound, one in clockwise direction and the other in anti-clockwise direction on bobbin 155. Bobbin 155 is mounted on a shaft 156 with a gear 157 keyed thereon. Gear 157 is connected to an electric motor 158 by means of a transmission mechanism 159.

A bobbin 160 is mounted on the upper end portion of the shaft 156, and has both ends of a cable 161 wound there-onto, one in clockwise direction and the other in anti-clockwise direction. Cable 160 is guided by pulleys 162, 163 and 164, and is secured at point 165 to the upper end of bar 152. In order to move lateral indicator 144 and maintain it always parallel to the optical ray axis of the machine, cable 161 is provided with a branch cable 166 borne at point 167 and which is guided by pulleys 168, 169, 170, 171 and dying at point 172. Branch cable 166 is secured to lateral indicator 144 at point 173. Since bobbins 155 and 160 are mounted on a common shaft 156, cable 150 moves at the same rate as cable 166; similarly, pulleys 153, 162 and 168 are all mounted on shaft 195.

As with respect to curtain 146, as was previously stated, it is wound on shaft 149 and has its free end secured to bar 174. In order to drive curtain 146 and longitudinal indicator 145, bar 174 is connected at point 175 to a cable 176 guided by pulleys 177, 178, 179 and 180, 181 and 182. Furthermore, pulleys 179 and 182 are connected by a shaft 183 to a transmission arrangement 184 in turn connected to an electric motor 185; the path of cable 176 being, starting from point 175, over pulley 180, round pulleys 179, 181, 182, down to pulley 178 and then back to point 175, round pulley 177.

Similarly at the other end of bar 174 another cable 186 is secured at point 187; cable 186 being guided by pulleys 188, 189, 190, 191 and 192 back to point 187. Longitudinal indicator 145 is connected at its free end 193 to cable 186. As may be seen in FIG. 8, pulleys 189 and 191 are mounted on a first common shaft, and pulleys 188 and 190 are mounted on a second common shaft. Pulleys 177, 192 are mounted on a common shaft 194, so that cable 186 moves at the same rate as cable 176. The reversible electric motor 158, hereinabove mentioned, is controlled from control panel 34 by means of two push-buttons 196, one for the leftward movement and one for the rightward movement of curtain 147. Similarly reversible electric motor 185 is controlled from panel 34 by two push-buttons 197. It is to be understood that the two indicators and the two curtains which have not been illustrated and which respectively face indicators 144, 145 and curtains 146 and 147 will be connected to respective motors and cables which will, in turn, be controlled by four push-buttons 198 on control panel 34. Thus the four indicators are capable of limiting a zone on the view finder 42 and the four curtains will limit the equivalent portion on the film.

It will become apparent from FIG. 8, that some means must be provided, in order to automatically open the electric circuit of the indicator and curtain driving motors 158 and 185, in order to avoid indicator and curtain overrunning at the ends and at the meeting points of their paths. Thus, stationary switches 199 and 200 are provided in the path of a cam 201 mounted on cable 161 and suitably guided by a V-shaped channel member 201', which cable 161 controls the position, of lateral indicator 144. When cam 201 operates either control member 200' or 202, switch 200, 199, respectively is opened.

As will be seen in FIG. 9, the switches 199, 200 are connected in series with various light sources 203 and with electric motor 158. The light sources 203 are located below control panel 34 and when energized signal to the operator that an end position of a curtain has been reached, as will be described hereinbelow. Control panel 34 includes eight arrows 204 which will be described with reference to cam 201, switch 199, 200 and electric motor 158. It is to be understood that although only one telltale circuit is described, the remaining ones are structurally similar and operate in the same way.

As may be seen in FIG. 9, electric motor 158 is connected to a source of electric power through switches 199, 200 and through push-buttons 196. It should be borne in mind, that there is one push-button for reverse movement and one push-button for forward movement; similarly there is one switch 199 for limiting the movement to the right of indicator 144 and curtain 147, and one switch 200 for limiting the movement of the other lateral moving indicator (not shown) and curtain to the left. Furthermore, operation of switch 199 by cam 201 will open the motor circuit and close the electric light source circuit by which, one of the arrows 204 will be illuminated and the operator will become aware that the curtain is in one of its end positions.

Obviously, by switch 199 opening the electric motor power circuit it will stop the driving of a curtain past that position. Similarly the vertical movement of indicator 145 and curtain 146 is controlled by limit switch 200″. So far means have been disclosed to limit downward movement of curtain 146, but it is still necessary to provide switches to avoid that curtain 146 should meet its corresponding vertical curtain in the middle of their run, without the motors becoming de-energized, so as to avoid over-running. On longitudinal indicator 145 a switch 193' is provided which is normally closed and which may be operated by a cam 201″ mounted on the other longitudinal indicator schematically shown. Thus, on both longitudinal indicators coming into contact, the cam on one, will open the switch on the other, and the electric circuit of the pertinent driving motor will be opened.

As was superficially described with reference to FIG. 2, a mirror 139 is swingably mounted on an axis 140 forming in one position a 45° angle with ground glass view finder 42 and film bracket 138. This mirror 139, together with its driving mechanism will hereinbelow be further described with reference to FIG. 10.

Mirror 139 is driven by an electric motor 205 (see also FIG. 14) which is controlled by relay 206, as will be later described in specific reference to FIG. 14. Returning again to FIG. 10, electric motor 205 is connected to an eccentric driving arrangement consisting of a gear 207 having an arm 207' pivoted by pivot 208 to a connecting rod 209 which in turn is pivoted by pivot 210 to a bell-crank plate 211. Bell-crank plate 211 includes a pin 212, rigidly mounted thereon and fitted into an arcuate slotted cam-link 213. Furthermore bell-crank plate 211 includes a second pin 214 fitted into an arcuate slotted cam-link 215. Links 213 and 215 are pivoted about axis 216. Bell-crank plate 211 in turn is pivoted on pivot 217, mounted in stationary base member 218. Slotted link 213 is rigidly connected to mirror 139 and slotted link 215 to screen 141 (see also FIG. 11).

Thus, it will be seen that when electric motor 205 becomes operative by relay 206, the arrangement 207, 207', 208 will swing bell-crank plate 211 about pivot 217 which through pins 212 and 214 will drive slotted link 213 to rotate about axis 216.

Slotted cam 215 is provided with a first circular portion within which pin 214 will run without producing any movement of cam 215 about axis 216, and a second rectilineal portion which when reached by pin 214 will force slotted link 215 to rotate about axis 216.

As may be better seen in FIG. 11, slotted link 215 is mounted on a shaft 141' having axis 216. Shaft 141' swingably supports screen 141 (see FIG. 2). A bushing 139' is journalled on shaft 141'; bushing 139' swingably supports mirror 139. Upon lowering pivot 210 with regard to the position shown in FIG. 10, pin 212 describes an upwardly arcuate path, thereby forcing slotted link 213 in anti-clockwise direction about axis 216 and rotating bushing 139' and thus raising mirror 139 from its 45° position, as shown in FIG. 2, to a horizontal position below view finder 42, thereby sealing the entrance of light through said view finder 42.

During this period pin 214 will move along the circular portion of cam 215, and only once the mirror 139 has sealed the view finder 42, will pin 214 move within the rectilineal portion of cam 215 forcing the latter to rotate in anti-clockwise direction about axis 216 and thereby rotate shaft 141' and thus raising screen 141 from its 45° position wherein it sealed the film, to the horizontal position below mirror 139 giving access to perform the photograph on the film.

As may be seen also in FIG. 10, slotted link 213 includes at its free end a curved portion within which pin 212 will move once pin 214 has entered the rectilineal portion of cam 215. In this way, while the screen 141 is being lifted by the action of pin 214 within cam 215, mirror 139 is maintained in its horizontal position, due to the fact that pin 212 will not force slotted link 213 to describe any movement. Slotted link 213 is provided with its curved portion in order to obtain this effect. The curvature radius of the curved portion corresponds to the path described by pin 212 around pivot 217.

In order to synchronize the mirror movement with the firing of the shutter arrangement, the machine is so conceived that the operator can only open the shutter, once the mirror is in its horizontal position. A hammer 219 is pivoted to bell-crank plate 211, by pivot 210 (see FIG. 10). One end of hammer 219 is connected to a spring 220 resiliently urging hammer 219 to a predetermined position. Together with the swinging of bell-crank plate 211 about pivot 217, hammer 219 will be carried along a predetermined path at the ends of which switch actuating means 221, 222 are located, one for each switch arrangement 223, 224, also shown in FIG. 14, the operation of which will be explained in further detail with reference to that figure, when the shutter firing arrangement is described.

As has hereinabove been stated, this machine also includes an automatic focusing arrangement which will be now explained in detail with particular reference to FIG. 12.

In describing FIG. 3, it was stated that the machine includes an automatic focusing arrangement 88; the latter is connected to lens carriage 89 through cable 225. More particularly, and with regard to FIG. 12 lens carriage 89 (FIG. 3) is connected to a spool 226 (FIG. 12) by means of cable 225.

Spool 226 is connected to cam 227 through a speed reduction means 226' which may be better seen in FIG. 13. It will be appreciated that the speed reduction means 226' is necessary due to the fact that lens carriage 89 may move along the rails 77 a distance of up to approximately two meters, so that the size of spool 226, if only one turn were to be made, would be much too big in proportion with the size of cams 227, 231. From FIG. 12 it may be easily seen that cams 227, 231 can only rotate one revolution. Preloaded spring means 228 are connected to spool 226, in order to absorb any slack in cable 225. Similarly, holder carriage 33 is connected to spool 229 by means of cable 230. Spool 229 is connected to cam 231 also through a speed reduction mechanism 226" for the reasons as outlined above. As in the case of spool 226, spool 229 is connected to preloaded spring means 232 for urging spool 229 to absorb any slack in cable 230.

Cam 227 is permanently in contact with a cam follower 233 pivoted on pivot 236. Cam follower 233 includes a projecting arm 234 which extends over the cam surface of cam 231 and includes a passage 242 at the end remote from pivot 236. An arm 237 is provided above projecting arm 234 and also pivoted to pivot 236. The free end portion of arm 237 supports three contacts 238, 239, 240. Contacts 238 and 240 are rigidly connected to arm 237, while contact 239 is elastically movable between the two afore-mentioned contacts. Furthermore contact 239 is connected to a gauge screw 241 for controlling the distance between the three contacts. Gauge screw 241 rests on projecting arm 234 and may be used to adjust and control the automatic focusing arrangement. Arm 237 also includes at its free end a cam follower 243 passing through passage 242 and in contact with the camming surface of cam 231. Preloaded spring means 235 are provided between cam follower 233 and arm 237, in order to maintain cam follower 233 in permanent contact with cam 227 and cam follower 243 in permanent contact with cam 231.

As may also be seen in FIG. 12, contact 238 is connected to one end of switch actuating coil 244, its other end being connected to a source of electric current. Contact 240 is connected to one end of switch actuating coil 245, while its other end is also connected to said source of electric current. Switch actuating coils 244 and 245 are related to switches 250 and 251, respectively, which are connected in series with the power circuit of electric motor 80. Electric motor 80 was already described in connection with FIG. 3.

As has already been stated, revolver lens holder 43 includes a switch actuating projection 96 (FIGS. 6 and 12) capable of contacting one of three switches 247, 248, 249 each one, for one of the lens arrangements 44, 45, 46.

Upon lens 44, as shown in FIG. 12 being in operative position, switch actuating projection 96, closes switch 249, in turn connected to contact 239. Similarly, upon lens 45 being in the uppermost or operative position, the switch actuating projection 96 will close switch 247 connected to a similar circuit arrangement as the one shown in FIG. 12 for switch 249, and upon lens 46 being in the uppermost or operative position, the switch actuating projection 96 will close switch 248 connected to a similar circuit arrangement as the one shown in FIG. 12. Since the hereinabove referred to circuit arrangements are similar only the one corresponding to switch 249 is shown and described.

In the embodiment illustrated in FIG. 12, switch actuating projection 96 closes switch 249, which in turn is connected to movable contact 239 and to contacts 250' and 251' of coil actuated contacts 250, 251. The other contacts 250" and 251" of coil actuated contacts 250, 251, are connected to electric motor 80. Electric motor 80 is also directly connected to a source of electric current by conductor 246. Switch 249, at its end connected coil actuating contacts 250, 251, is connected by conductor 246 to one pole of said source of electric current.

As may also be seen in FIG. 12, reversible electric motor 92 corresponding to lens carriage 89 is connected through pushbuttons 93 to the source of electric current. Two push-buttons 93 are included, one for the forward movement of electric motor 92 and one for the reverse movement of electric motor 92.

For several special effects, for instance where a flux image is required, the automatic focusing system must be cut out and a manually focusing arrangement must become operative. For this purpose, on conductor 246', of the main supply line for electric motor 80, a selector switch 252 is included. As may be seen in FIG. 12, in one position selector switch 252 connects the automatic focusing system and in the other, connects electric motor 80 to the electric current supply source through push-buttons 81. In this way it will be seen that by means of push-buttons 81, electric motor 80 can be driven in either direction, without resorting to the automatic focusing system.

In FIG. 13, three different cams with their corresponding cam followers are illustrated, one cam and one cam follower for each one of the lens arrangements 44, 45 and 46; each cam and cam follower being supplied by corresponding contacts, equivalent to contacts 238, 239 and 240 connected thereto by terminals 247' and 248'.

As may be seen, these cams 227, 227' and 227", respectively control cam followers 233, 233' and 233", in turn integral with projecting arms 234, 234' and 234" forming part of the cam arrangements 231, 231' and 231". All of the cams 227, 227' and 227" are operatively connected to spool 226 and all of the cams 231, 231' and 231" are operatively connected to spool 229.

As has been generally stated herein above, the subject machine includes a scale indicator 47 having three scales 47A, 47B and 47C and one pointer 48; furthermore it includes a second scale indicator 49 also having three scales 49A, 49B, and 49C and a single pointer 50. Scale indicator 47 comprises a preloaded spring drum 47" having scales 47A, 47B and 47C marked thereon and on which a cable 47' is wound, having its other end secured to lens carriage 89, as seen in FIG. 2. Thus on lens carriage 89 being moved through motor 92, cable 47' will turn drum 47" corresponding to indicator 47 producing a corresponding movement of scales 47A, 47B and 47C. Indicator 49 (FIG. 1) is similarly connected to a second cable or alternatively tandem-like to cable 47'. Indicator scales 47A, 47B and 47C and scales 49A, 49B, 49C are differently graduated so that each one will give different information, as previously explained. Thus, by means of scale indicator 47 the operator may determine the size of the projection obtained by the position of lens carriage 89.

The other indicator, that is to say scale indicator 49 enables to read directly the letter size achieved on the film, when types are used.

The shutter arrangement firing circuit will now be described with reference to FIG. 14. As has been previously been stated, push-buttons 135 is provided on control panel 34. This push-button 135, is connected in series with interruptor arrangement 224, see also FIG. 10, in order to close the power circuit for relay 206, whose magnetic field acts on contacts 253 which, when closed, maintain relay 206 self-energized. Furthermore, contacts 254 are provided, which are also arranged within the magnetic field of relay 206, so that when closed, will connect the electric circuit of electric motor 205 to the source of electric power. It may be easily followed that the power circuit of motor 205 comprises conductor 255, contacts 254, conductor 256, electric motor 205 and conductor 257. It should be borne in mind that switch arrangement 224, in its rest position, closes the power circuit of relay 206. Furthermore upon energizing motor 205, mirror 139 and screen 141 are operated, as explained and connection with FIG. 10.

As was seen with regard to FIG. 14, hammer 219 acts on two interruptor arrangements 223, 224. Interruptor arrangement 223 is connected to a relay 265 which is de-energized, once hammer 219 stops acting on interruptor arrangement 223, as contacts 289 and 290 will be opened. When relay 265 is de-energized it does not act on contacts 258 and 259, so that these remain closed, which corresponds to their normal position, thus energizing elcetromagnet 117 (see also FIG. 5) with which, the shutter arrangement 95 will become closed. From what has been stated, it may be seen, that shutter arrangement 95 is maintained closed, while mirror 139 is in movement.

Switch arrangement 224 is connected through contacts 260, 261, actuated by relay 262, to a timer 51 (see also FIG. 1) by means of which the operator may prefix the exposure time; in other words, the time during which the shutter will be opened. Timer 51 is connected to switch 264 which controls relay 265 through switch arrangement 223, corresponding to contacts 258 and 259 which, when closed (de-energized state of relay 265) will connect electric motor 205 to its power circuit, for the downward movement of the mirror 139 and screen 141.

As has previously been seen, a push-button 134 is provided, which enables to operate the shutter arrangement 95 (see also FIG. 5) independently of the shutter firing circuit.

A more detailed explanation of the electric circuits forming part of this machine will now be given with respect to its operation, which will facilitate the understanding thereof. To this end, a complete cycle of operation will be described together with further structural details.

In first instance it is necessary to prepare the original from which the photo-composing is to be made. In this respect there are two possibilities, the first is that the original is not transparent or translucid and the second is that the original is transparent. In the first event it is necessary to use bulbs 82 screened from the revolving lens holder 43 by screen 263 (FIG. 2), and in the second event bulbs 83 are used. The first case will be described in more detail.

Thus, the first step is for the operator to mount his original within supporting frame arrangement 31 (FIG. 1) and insert it through door 32 into the machine. In the event that the original is to be prepared by combining different patterns, one consisting of a text to be formed with types, the types according to the embodiment of FIGS. 15, 16 are used. The supporting frame arrangement 31 consists of a bracket 266 having transeparen glass 267 mounted therein. A handle 268 is provided on the upper part of bracket 266 for convenience. The upper and lower parts of bracket 266 are provided with open ended slots (only the upper ones being visible), for reasons that will be given hereinbelow. Supporting frame arrangement 31 also includes a mounting plate 271, having guide rails 272, 273 mounted thereon and within which a type line (FIG. 17) may be mounted. Furthermore supporting frame arrangement 31 includes a second bracket 274 having upper fixed pins 275, 276 at its upper portion and lower fixed pins 277 (only one visible) at its lower portion. Within bracket 274 a transparent glass 279 is also mounted. In order to secure mounting plate 271 between brackets 266 and 274 elastic means 278 and 280 are provided.

As seen in FIG. 16, only a single size of types 281 is provided which are usually made of plastic and have a dark front background, while the rear portion has several differently coloured channels 281', one for each type of letters, which facilitates identification. The types 281 are mounted on a bracket 282 (FIG. 17) to form desired words after which, bracket 282 is inserted between guide rails 272, 273 and clamped into position by means of a slidable bar 283. After this, the fixed pins 275, 276 and 277 of bracket 274 are first inserted into the above mentioned open ended slots. In order to secure bracket 274 to bracket 266, a pair of locking sliders 284 is provided, elastically urged to an interlocking position by spring 285, and having hook members 269 and 270 engageable with said pins 275, 276.

The lower portion of second bracket 274 also includes two elastically urged sliders (similar to sliders 284), likewise having hook members and engageable with the lower fixed pins 277 (only one visible).

Once the original with its supporting frame arrangement 31 is mounted on bracket 52 (FIG. 2) and the operator has his schedule S (FIG. 21) arranged on the ground glass view finder 42, the next step is to illuminate the original by means of switches 84 or 85 according to whether the original is transparent or not. With this, the operator will have an image of the original on the ground glass view finder 42 bearing in mind that the shutter arrangement 95 is normally open. The next step is to select the lens which will be used, according to the size of the original and to the size of the resulting pattern he wishes. In the particular embodiment illustrated, the operator has three possibilities, that is to say three lens arrangements 44, 45 or 46.

Once the lens has been selected, he is in a position to adjust the position of lens carriage 89 according to the size of pattern required. The correct position of lens carriage 89 is determined by scale indicators 47 and 49. If the original includes letters 281, the indicator 49 will directly indicate the size of the resulting letters, defining the text to be photographed. At this stage it is now necessary to operate the focusing system either by hand actuating push-buttons 81 or switching on the automatic focusing system by means of selector switch 252, which will have to take the position shown in FIG. 12, therefor and to which reference will now be made. By having determined which lens is to be used, and the position of the lens carriage 89, checking on scale indicator 47 and using push-button 93 to operate electric motor 32, one of the three cams 227, 227', 227'' (see FIG. 13), in this particular example cam 227 (FIG. 12.) together with its corresponding (contacts 238, 239 and 240) becomes operative by switch actuating projection 96. Furthermore, since cam 227 is directly connected by means of cable 225 to lens carriage 89, the position of said cam 227 is thereby established. The position of lens carriage 89, as already stated, is controlled by push-buttons 93, which close the power circuit of electric motor 92. On moving lens carriage 89 backwards and forwards, cam 227 will rotate and operate cam follower 233 which will thus, in turn change the position of projecting arm 234, It will now be seen that if contacts 238 and 239 are closed coil 244 will be energized closing contacts 250 and thus energizing electric motor 80 in a predetermined direction which will move holder carriage 33, accordingly. As holder carriage 33 is connected to cam 231, cam 231 will rotate until cam follower 243 further separates arm 237 from projecting arm 234; in this case contact 238 will separate from contact 239, in turn opening the energizing circuit of coil 244, in turn opening coil actuated contacts 250 and halting electric motor 80.

In the event that holder carriage 33 has overrun the focusing position, due to inertia, cam 231 will have passed the position corresponding to a correct focusing position and screw 241 will be separated from projecting arm 234, so that contacts 239 will come into contact with contacts 240 closing the energizing circuit of switch actuating coil 245 and closing coil actuated contacts 251, thus actuating electric motor 80 in the opposite direction. It will thus be seen, that electric motor 80 is powered in one direction and in the other until the desired correct focusing position is automatically achieved. It should here be stated, that cam 231 is of such a contour, that its distance from the centre is progressively increasing in the clockwise direction as seen in FIG. 10. Cam 227 may be drawn by a method of trial and error, so that each point corresponds to a correct predetermined focusing distance.

In case the operator wishes to undertake the fousing manually, all he has to do is set over switch 252, connecting push-buttons 81, and then actuate either one or the other of push-button 81, so as to bring holder carriage 33 nearer the film or nearer the original, checking in this event the result he desires to obtain on the view finder 42.

Once the pattern has been focused, it is necessary to peripherically limit the entrance of light to the film, so that only the predetermined pattern which he wishes to photograph will be recorded on the film. To this end, the curtain arrangement is to be used (see FIG. 8). As has hereinabove been stated, the position of the curtains is determined on ground glass view finder 42 by defining a rectangle of smaller size than the view finder 42, using the pairs of lateral and longitudinal indicators, of which only lateral indicator 144, and longitudinal indicators 145 are shown in FIG. 8. However in FIG. 1 the two lateral indicators 144 and the two longitudinal indicator 145 are shown, defining pattern B' which has already been mentioned with reference to FIG. 21.

In order to move the curtains 146 and 147 and their homologues, the operator works on the right push-buttons 196, 197, 198 each one of these push-buttons controlling the pertinent one of the four reversible driving motors of the curtains (see for instance FIG. 9). If the vertical or lateral moving curtains should come into contact or reach the end of their respective runs, indicator arrows 204 will become lit, as has hereinabove been described and furthermore the driving motors will be brought to a stop, so that the operator will easily become aware of the curtain position and thus not insist on over running them further.

Once the curtains have been so placed as to only leave open or unprotected the portion of the film which is to be exposed, the operator is in a position to actuate the shutter firing circuit. To explain this, reference will be made to FIG. 14. It being understood that at least at this stage the timer 51 has been set.

By merely pressing push-button 135 a series of automatic operations will be performed ending with the photograph taken and consequent reopening of the shutter arrangement 95 to have the machine ready for a next cycle operation.

Thus, on closing the contacts corresponding to push-button 135, relay 206 is energized, which in turn closes contacts 253 and 254. Contacts 253 maintain relay 206 permanently energized, while switch arrangement 224 is in its rest position. By contacts 254 becoming closed, electric motor 205 will be energized and mirror 139 (see also FIGS. 2 and 10) will be driven to its horizontal view finder sealing position. The instant hammer 219, due to clockwise rotation of bell-crank plate 211, separates from switch arrangement 223 (FIG. 10), contacts 290 are opened, thus de-energizing relay 265, whereby contacts 258 and 259 become closed. Due to closure of contacts 259, electromagnet 117 becomes energized, thus moving shaft 116 to the right, as seen in FIG. 5, and closing the shutter arrangement 95, so that the film remains protected. Reference to the circuit portion operated by contacts 258 will be made later on.

By means of the mechanism illustrated in FIG. 10 and after a predetermined interval, screen 141 will adopt a position similar to that reached by mirror 139. Upon screen 141 reaching its horizontal position, hammer 219 will act on actuating means 222 opening the electric circuit corresponding to electric motor 205 and thus halting screen 141 in its horizontal position.

Furthermore, as contacts 258 will be closed the reverse motion of electric motor 205 is partially connected, but as contacts 260 are open, electric motor 205 is inoperative.

Upon hammer 219 hitting actuating means 222, timer 51 is connected, which instantly connects switch 264, which through contacts 286, which are now closed, will energize relay 265, opening shutter arrangement 95 by means of contacts 259 and electromagnet 117, which has become de-energized.

Furthermore, the closing of contacts 287 will have energized relay 262, thus closing contacts 261, which will maintain relay 262 permanently energized and furthermore closing contacts 260, which connect the reverse movement of electric motor 205, which will not become operative, as now contacts 258 are open. Upon timer 51 closing switch 264, the shutter arrangement 95 is opened, as just stated, and at the same time, timer 51 will start its exposure time control.

Once this exposure period has elapsed, timer 51 disconnects switch 264, de-energized relay 265, thus, electrically connecting electromagnet 117, which will close again shutter arrangement 95 and having thus photographed the pattern. Furthermore contacts 258 will become closed and as contact 260 is also closed, electric motor 205 will be energized and mirror 139 and screen 141 will be lowered. Upon bell-crank plate 211 reaching again the position shown in FIG. 10, hammer 219 acts again on switch arrangement 223, thereby, though energizing relay 265, de-exciting electromagnet 137 and re-opening shutter arrangement 95.

Once the timer 51 has finished its count, switch 264 and timer 51 will not become operative again until contact 287 is again closed. Also when hammer 219 stops acting on actuating means 222, contacts 287 become opened and thus relay 262 will no longer be energized therethrough, although it will be self-energized through contacts 261, and the machine is ready for a new operation.

In order to provide a possibility of inverting the image on the film, which so far in the art has been obtained by means of a prism situated adjacent the lens, the present invention suggests the following alternative. The view finder 42' and film supporting bracket 52' are arranged in a vertical position, as is illustrated in FIG. 19. Also, differently to the example previously described, the view finder 42' and the bracket 52' are stationary and not mounted on rails 306. In order to place the image in its desired position the lens carriage, which is similar to carriage 89, will be laterally and vertically movable, similar to the holder carriage 33, previously described. Furthermore the curtain and indicator arrangement will be replaced by a double set of synchronized curtains 291, 291', 292, 292', 293, 293', 294, 294'. Curtains 291, 291' and 292, 292' are vertically spaced apart, although this cannot be seen in FIG. 19, where actually only the spools of the lower curtains are shown, but for sake of simplicity identified as "291, 291'" and "292, 292'."

The driving mechanism for curtains 291, 291', 292, 292', 293, 293', 294, 294' is similar to the driving and synchronizing arrangement described with reference to FIG. 8, so that it is not believed necessary to describe it hereagain. In the event that the operator wishes to invert the image, the view finder 42' will correspond to face 295 and the bracket 52' will correspond to face 296 as shown in FIG. 19. While the operator is viewing the image on view finder 42' mirror 139' and screen 139" will be in a position parallel to bracket 52', so that the light coming from the original will follow the path of arrow 297. When a photograph is to be taken, mirror 139' and screen 139" will be located at an angle of 45° with regard to bracket 52' and once in this position, shutter arrangement 95 will be opened and the exposure will be undertaken by the light reflected on mirror 139', and will follow the path of arrow 298. As a sub-alternative it is possible to position the view finder in place of bracket 52' and bracket 52' in place of view finder 42', so that a direct image will be obtained on the film and an indirect image will be seen on the view finder. The mechanism for swinging the mirror 139' is not described, since it can readily be conceived from the previous explanation given in relationship with FIG. 10.

In case the zones of the original are not definable by rectangular shapes, the curtain arrangement so far described cannot be used alone. In this event, it will be necessary to mask those film portions which are not to be exposed, by special masks (usually made of paper) having an irregular shape.

In this embodiment the swingable mirror arrangement used in the two embodiments so far described, and the view finder 42, as shown in FIG. 2 becomes superfluous. In this event with regard to the embodiment shown in FIG. 1, the table 35 is simply a closed desk and the opening in which the film bracket 138 is housed is enlarged. Within this opening, a frame 299 is housed, having a lower rail 300 and an upper rail 301. Within this pair of rails 300, 301, a door frame 316 having a pair of projecting rails 317, 318 is slidably mounted and hingedly supports at one end portion a door 309 so that it can be opened, as shown in dotted lines. Within rails 317, 318 a second door 307 is hingedly and slidably mounted. Frame 299 supports on its righthand end and on the inner side, a blind screen 304 and if door 307 is in the position as shown in FIG. 18, the film bracket 52 containing the film is protected, against any light. The frame 305, which has already been previously explained (see for instance FIG. 3), is preferably provided with a curtain arrangement 146 and 147, likewise of the same type as previously explained, but in front thereof there is a transparent glass 308. Door 309 is used as a view finder and to this end includes a ground glass 309′ on which the operator can see the image and the curtain arrangement 146, 147, and thus define a rectangular zone. Door 309 is slidable within rails 300, 301 for zone finding purposes. If now within this zone, which is identified as E, a certain irregularly shaped pattern is to be defined, the operator will place on the remaining portion on glass 308 after opening door 309 a mask, such as indicated by dotted line M, whereby the pattern E is further limited. Once the mask has been placed on the glass 308, the operator moves door 307 into the space defined by previously opened door 309, towards the left, so that the film bracket 52 will be located in front of the glass 308, whereupon the exposure may take place. Thereafter, the door 307 is again returned to the start position, as shown in FIG. 18, door 309 is closed and a new masking operation may start. Door 307 is to be opened in order to fit and withdraw the frame 52 with the film.

If desired, as will be obvious to those skilled in the art, the frame 299 may be provided with micro-switch arrangements, which ensures that a photograph may only be taken, or in other words, that the push-button 135 (FIG. 1) can only properly be operated by the operator, when the door 307 is in front of glass 308.

The embodiment illustrated in FIG. 18 may be conveniently used to photograph the text of one label, twenty or thirty times on the same film. In this way it will be appreciated that the one film obtained may be used to print the twenty or thirty labels at a time, which thereafter will be clipped by modern electronic clipping machines operating at high precision, and which do not form part of this invention, so it is not believed necessary to describe them specifically. The precision required in photographing the above mentioned labels has made it necessary to movably mount frame 299 on two motor operated endless screws 310, 311. Rails 317, 318 may likewise be connected to a precision driving arrangement for moving along rails 300, 301.

Furthermore, as will be obvious to those skilled in the art, it is convenient that the front end 30a of the photo-composing machine 30 is a dark room to safeguard the film upon being manipulated.

Although several embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A photo-composing machine, comprising a holder carriage for originals to be photo-composed, a lens carriage having lens means defining an optical axis and facing said holder carriage, means for causing relative movement between said carriages along the optical axis, one of said carriages being movable at least in two directions substantially perpendicular to each other and substantially perpendicular to the optical axis, the other of said carriages being movable at least in a direction substantially perpendicular to the optical axis, a bracket for a film, a view-finder, said film bracket and view-finder being optically coupled to each other and to said lens carriage, and mask means for masking part of said view-finder and film bracket.

2. A photo-composing machine according to claim 1, wherein said optically coupled film bracket and view finder are movable as a unit in a direction substantially perpendicular to said optical axis and to the direction of movement of said other carriage.

3. A photo-composing machine, comprising a holder carriage for originals to be photo-composed, a lens carriage having lens means defining an optical axis and facing said holder carriage, means for causing relative movement between said holder carriage and lens carriage in three substantially perpendicular directions, a film bracket for a film, a view-finder, said film bracket and view-finder being optically coupled to each other and to said lens carriage, said optically coupled film bracket and view-finder being movable as a unit in a direction substantially perpendicular to said optical axis, and mask means for masking part of said view-finder and film bracket.

4. A photo-composing machine, comprising a holder carriage for originals to be photo-composed, movable in three substantially perpendicular directions, a lens carriage having lens means defining an optical axis and facing said holder carriage, said lens means being movable in two of said previously mentioned three substantially perpendicular directions of which one enables approaching and spacing apart of one carriage with regard to the other; a film bracket for a film, a view-finder, said film bracket and view-finder being optically coupled to each other and to said lens carriage, and mask means for masking part of said view finder and film bracket.

5. A photo-composing machine according to claim 4, wherein said optically coupled film bracket and view-finder are movable as a unit in a direction substantially perpendicular to said optical axis.

6. A photo-composing machine, comprising a holder carriage for originals to be photo composed, a lens carriage having lens means defining an optical axis and facing said holder carriage, means for causing relative movement between said carriage along the optical axis, a bracket for film, a view-finder, said film bracket and view-finder being optically coupled to each other and to said lens carriage, mask means for masking part of said view-finder and film bracket, means for causing relative movement between said holder carriage and said film bracket in two directions substantially perpendicular to each other and substantially perpendicular to said optical axis, and means for causing relative movement between said lens carriage and said holder carriage and film bracket in two directions substantially perpendicular to each other and substantially perpendicular to said optical axis.

7. A photo-composing machine comprising a housing, defining a floor zone with guide means, a front end portion and a rear end portion, said front end portion including a control panel, a view-finder and a film bracket coupled to said view-finder, said rear end portion having an opening, said guide means on said floor zone being arranged between said front end portion and said rear end portion, a supporting frame arrangement for originals, a holder carriage movably mounted on said guide means adjacent said rear end portion, driving means controllable from said control panel for moving said holder carriage along said guide means for focusing purposes, said holder carriage including a bracket for said supporting frame for originals, said bracket being movably mounted perpendicularly to said guide means on said holder carriage, said opening enabling the insertion and withdrawal of said supporting frame arrangement for originals with regard to said bracket of said holder carriage, a movable lens carriage mounted on said guide means and located between said holder carriage and said front end portion, said lens carriage including a vertically movable base plate, at least one lens on said base plate directed towards said bracket of said holder carriage, a shutter arrangement mounted on said base plate behind said lens and adapted to face said film bracket, said view-finder and film bracket defining a maskable exposure zone, position index means on said control panel indicating the position of said lens carriage with regard to said guide means, thereby defining the scale of the photograph to be taken, and a firing circuit for said shutter arrangement adapted to maintain said shutter arrangement open in inoperative position and successively to close, open, close again and open again said shutter arrangement in timed sequence upon becoming inoperative, the period existing between the opening and closing after the first closure defining the exposure on the film, said firing circuit being operable from said control panel.

8. The photo-composing machine as claimed in claim 7, wherein said guide means is a pair of rectilineal rails, said holder carriage and said lens carriage each having wheels adapted to roll on said rails, said driving means of said holder carriage including a first reversible electric motor connected to said holder carriage through a first cable transmission, and controllable from said control panel, a second reversible electric motor, said lens carriage including a second cable transmission position controlled for scale purposes by said second reversible electric motor likewise controllable from said control panel, a first pointer, a first scale bearing preloaded spring drum and a third cable transmission connected to said lens carriage and to said first preloaded spring drum in operative relationship with said first pointer and forming part of said position index means, and a second pointer and a second scale bearing preloaded spring drum in operative relationship with said second pointer and mounted on said control panel, and likewise coupled to said movable lens carriage and indicative of letter size.

9. The photo-composing machine as claimed in claim 8, wherein said holder carriage includes a bracket adapted to hold said supporting frame arrangement for originals, said bracket being vertically slidably arranged in lateral guides, said holder carriage including support members movably supporting said lateral guides in transverse direction to said rails, a third reversible electric motor controllable from said control panel for raising and lowering said bracket within said lateral guides and a fourth reversible electric motor controllable from said control panel for transversely moving said lateral guides on said support members, a first light source mounted on said holder carriage in front of said bracket for illuminating non-transparent originals, said first light source being controllable from said control panel, and a second light source mounted on said holder carriage behind said bracket for illuminating transparent and translucid originals, said second light source being controllable from said control panel.

10. The photo-composing machine as claimed in claim 7, wherein said lens carriage includes a pair of spaced apart vertical lateral guides, said base plate being movably arranged in said pair of lateral guides and laterally projecting beyond them, said base plate being raisable by means of a fifth electric reversible motor controllable from said control panel, said base plate having an upper edge and a lower edge, a pair of roll-up curtain members one connected to said upper edge and one connected to said lower edge for shielding the space defined by said pair of lateral guides defined above and below said upper and lower edges, a revolving lens holder revolvably mounted on said base plate, a spider projector mounted on said revolver lens holder and coaxial with the axis of rotation thereof, a plurality of lens arrangements mounted on said revolver lens holder at a constant radial distance with regard to said axis of rotation thereby defining a constant distance between said axis of rotation and the optical axis of each lens arrangement, said spider projector including a light source for projecting a spider image onto said view-finder, said light source being controllable from said control panel, electromagnetic operating means for firing, said shutter arrangement likewise mounted on said base plate being connected to said electromagnetic operating means for firing, said electromagnetic operating means being controllable from said control panel.

11. The photo-composing machine as claimed in claim 7, wherein said front end portion defines a table and a front plate having an opening and arranged below said table and forming substantially a right angle therewith, a viewer frame, said table having inserted said viewer frame, a further frame supporting at right angle said view-finder and film bracket, a plurality of rails transversely arranged to said floor zone in said housing within said front end portion slidably supporting said further frame, said view-finder entering said viewer frame, said film bracket facing said opening in said front plate and said shutter arrangement, within said further frame a mirror is angularly movably mounted about an axis and capable of adopting a first end position parallel to said view-finder for sealing said exposure zone from light capable of entering through said view-finder, and a second end position at 45° with regard to said view-finder and film bracket and with its reflecting surface directed towards said shutter arrangement, to be capable of reflecting onto said view-finder the image focussed by said lens arrangements, a screen swingably mounted below said mirror and adapted to describe substantially the same path as said mirror, said firing circuit for said shutter arrangement being coupled and synchronized to staggered driving means for said mirror and screen whereby said shutter becomes first closed upon said mirror sealing said view-finder and remains closed until said screen is located adjacent said mirror in said sealing position, and then carries out the film exposing opening and closing.

12. The photo-composing machine as claimed in claim 7, wherein said view-finder and said film bracket are arranged at 90°, a mirror arranged between said view-finder and said film bracket, and adapted to seal one of said view-finder and film bracket in one end position and to reflect the image appearing in said shutter arrangement in the other end position where said mirror is arranged at 45° with regard to said view-finder and film bracket, and synchronized curtain means adapted to at least partially mask said view-finder and film bracket.

13. The photo-composing machine as claimed in claim 7, wherein said front end portion defines a front plate having an opening, a frame facing said shutter arrangement and having a transparent glass facing said opening of said front plate, a pair of spaced apart rails in said front plate and slidably supporting a first hinged door and a second hinged door adapted to be arranged in front of said transparent glass, a blind screen supported by said rails adjacent said transparent glass, a film bracket slidably housed within said rails and position controlled by said second door and adapted to be housed in front of said blind screen and in front of said transparent glass, said transparent glass permitting to mount thereon a mask.

14. The photo-composing machine as claimed in claim 11, wherein said staggered driving means comprises a sixth electric motor, a stationary base member, a bell-crank plate pivotally supported on said stationary base member, an eccentric driving arrangement coupled to said sixth motor, and to said bell-crank plate, a shaft, a bushing, said screen being swingably mounted on said shaft, said mirror being swingably mounted on said bushing mounted on said shaft, a first slotted link, a second slotted link, said shaft supporting said first slotted link, said bushing supporting said second slotted link, a first pin mounted on said bell-crank plate and meshing within said first slotted link, a second pin mounted on said bell-crank plate and position controlling said second slotted link, said first and second pivots are capable of staggered driving said mirror and screen, a hammer, a first switch arrangement, said bell-crank plate further supporting said hammer capable of operating said first switch arrangement for controlling said shutter arrangement and a second switch arrangement for controlling said sixth electric motor.

15. The photo-composing machine as claimed in claim 11, wherein said view-finder, having a pair of parallel longitudinal indicators crossed by a pair of parallel lateral indicators movable along said view-finder to define a masked zone, a curtain connected each of said indicators and facing said film bracket to define thereon a corresponding masked zone.

16. The photo-composing machine as claimed in claim 15, wherein said indicators being end position controlled by switch means capable of indicating an end position on said control panel and driving motors for said indicator likewise controlled by said switch means.

17. The photo-composing machine as claimed in claim 7, wherein said supporting frame arrangement for originals comprises a first bracket, a second bracket, said first bracket being housable in said second bracket and a mounting plate for originals resiliently stationarily housable between the two brackets.

18. The photo-composing machine as claimed in claim 17, wherein said mounting plate comprises a pair of spaced apart guide rails, a slidable bar mounted on said pair of spaced apart guide rails, at least one type supporting bracket for supporting types adapted to be housed and clamped between said guide rails and slidable bar.

19. The photo-composing machine as claimed in claim 18, wherein said types having a front face defining the sign and rear face, differently coloured channels forming part of said rear face for type-identifying purposes.

20. The photo-composing machine as claimed in claim 8, wherein said holder carriage and said lens carrige are each connected to a cam forming part of an automatic focussing system, a cam follower in operative relationship with said cam of said lens carriage, said cam follower having a projecting arm, a pivot, said cam follower and projecting arm are pivotally mounted on said pivot, a spring loaded arm pivoted to said pivot and having a cam follower in operative relationship with said cam of said holder carriage, a pair of stationary spaced apart contacts, said arm supporting said pair of stationary spaced apart contacts, a gauge screw, a movable contact likewise supported by said arm and arranged between said stationary contacts and having said gauge screw abutting on said projecting arm for gauging said movable contact with regard to the stationary contacts, said movable and stationary contacts and controlling said first reversible electric motor.

References Cited by the Examiner
UNITED STATES PATENTS

| | | | |
|---|---|---|---|
| 2,938,427 | 5/1960 | Alves | 88—24 |
| 3,115,815 | 12/1963 | Friedel | 95—4.5 |

NORTON ANSHER, *Primary Examiner.*

R. A. WINTERCORN, *Assistant Examiner.*